United States Patent Office 2,876,976
Patented Mar. 10, 1959

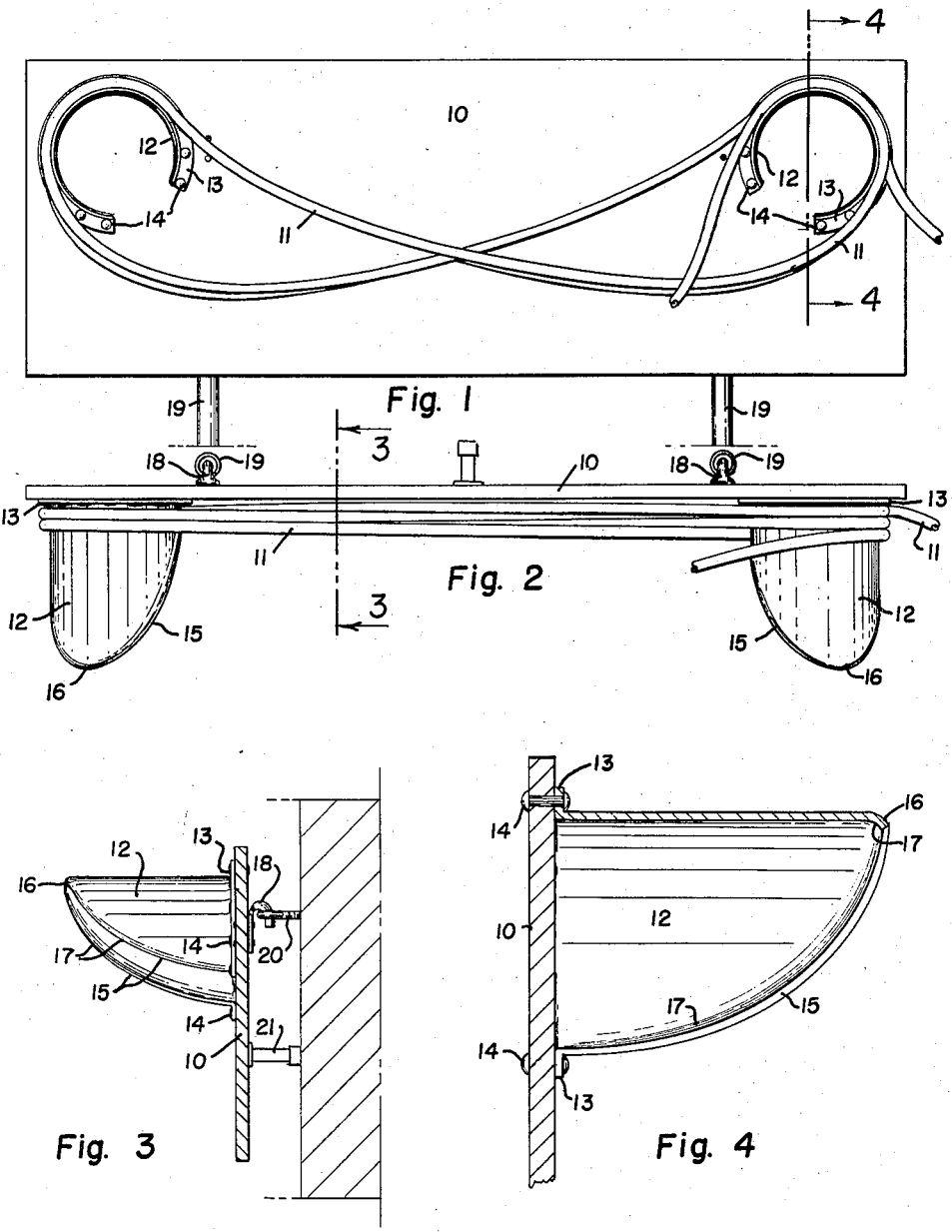

2,876,976

STORAGE RACK FOR HOSE AND THE LIKE

Irving K. Browning, Kittredge, Colo.

Application October 15, 1956, Serial No. 615,971

4 Claims. (Cl. 248—90)

This invention relates to racks or supports for the compact storage of long flexible members, such as lawn hose, air lines, clothes lines, and the like, in position and condition of convenient availability, and has an an object to provide a novel and improved construction and organization of elements constituting a unitary such facility.

A further object of the invention is to provide a novel and improved storage rack for hose, and the like, that is simple and economical of production in form adaptable to a variety of particular use installations.

A further object of the invention is to provide a novel and improved storage rack for hose, and the like, adapted to receive an associated flexible member as connected ready for use and to release desired lengths of such member for use free from kinks or twists therein.

A further object of the invention is to provide a novel and improved storage rack for hose, and the like, that is susceptible of production in any desired range of sizes and capacities, that is convenient of installation in any desired use location, that is sturdy in a rigid, durable, unitary assembly, and that is efficient in attainment of the ends for which designed.

With the foregoing and other objects in view, my invention consists in the construction, arrangement, and operative combination of elements as hereinafter set forth, pointed out in my claims, and illustrated by the accompanying drawing, in which:

Figure 1 is a front face elevation of a typical embodiment of the invention as associated with a length of hose in one of the practical installations for which it is adapted.

Figure 2 is a top plan view of the organization and arrangement according to Figure 1.

Figure 3 is a cross section through the rack according to the preceding views in an alternative installation to which it is adaptable and with the associated hose removed, taken substantially on the indicated line 3—3 of Figure 2.

Figure 4 is a fragmentary, detail section, on a relatively enlarged scale, taken substantially on the indicated line 4—4 of Figure 1.

In the very extensive use of lawn hose for irrigation purposes, it is a common convenient practice to maintain the hose connected with its supply line in condition of immediate availability. Such practice promotes occasion for a rack whereon the connected hose may be stored in a practical and sightly manner when the hose is not in use and wherefrom the hose may be extended as desired as an incident of hose use manipulations free from twists and kinks, and the instant invention is hence directed to the provision of a novel and improved such rack characterized by efficient practicality and expedient adaptability as to installation.

The elements particular to the improved rack of the invention are fixedly carried by and form a unitary assembly with a flat, rigid panel 10, of any appropriate material, sized and proportioned in a length considerably exceeding its width to the type and size of the flexible member the rack is designed to accommodate in such manner as to permit looping of the flexible member against and within the outline of the panel face area without undue strain on or damage to the member. The panel 10 is conditioned to support the flexible member, illustrated in Figures 1 and 2 as a section or length 11 of lawn hose, in accordance with the principles of the invention through the provision of a pair of identical, generally cylindrical brackets or arms 12 fixed to and similarly projecting in spaced relation from one face of the said panel in a construction and arrangement featuring the invention.

Identically constituted from initially-flat blanks of sheet metal, or the equivalent, each of the brackets 12 is a longitudinally-interrupted tubular member of a diameter about which the associated flexible member may be looped without strain or damage and a maximum axial length appropriate to accommodate a desired number of flexible member loops thereabout in juxtaposed relation therealong. At one end, each bracket 12 is formed to a plane substantially perpendicular to the axis of the tubular member defined by an integral, interrupted, annular flange 13 extending either inwardly or outwardly of the tubular member in a disposition adapted for engagement against the face area of the panel 10, whereby to provide for secure attachment of the bracket to the panel, as by means of rivets 14, or the equivalent, engaged at intervals through said flange and the panel area thereby overlain, as is common practice. The annular continuity of the flange 13 is interrupted by a gap on the order of sixty to ninety degrees, and from the end of the flange at each side of such gap the tubular member wall of the bracket 12 is arcuately and outwardly contoured, as at 15, to define a rounded apex 16 determining the maximum axial length of the bracket at the side of the tubular member wall diametrically opposite the gap interrupting the flange 13; the tubular member walls at each side of the gap in the flange 13 hence diverging axially of the member and outwardly thereof away from said flange to merge in the said rounded apex 16. For the elimination of sharp edges and corners which might damage surface areas of the associated flexible member and to facilitate sliding of said member thereover, the margin of the rounded apex 16 and the tubular wall margins converging thereinto are rolled or otherwise worked inwardly of the tubular member, as at 17.

To give effect to the principles of the invention, one of the brackets 12 formed as above described is affixed by means of its flange 13 and the rivets 14 as above set forth to a face of the panel 10 inwardly adjacent one end and one long margin of the panel with the gap in the flange 13 directed to open toward the opposite long margin of the panel at an inclination away from the adjacent panel end, thus to dispose the maximum axial length of the bracket determined by the rounded apex 16 in extension substantially perpendicularly from the panel near the adjacent exterior corner of the latter and substantially on the corresponding diagonal of the panel. Fixed to the same face of a panel 10 as above described, the two brackets 12 of each rack unit are separated by a considerable spacing, are arranged with their axes substantially parallel, and are disposed with the gaps of their flanges 13 convergently directed inwardly across the panel and toward the long margin thereof more remote from the brackets.

The rack unit is completed ready for use through the provision of a pair of like hooks 18 fixed to the face of the panel 10 opposite to that carrying the brackets 12 to open across the panel and toward the long margin thereof more remote from said brackets from like dispositions relative to the panel ends and proximity to the other long panel margin. The hooks 18 serve to mount the unit in position of practical use with the plane of the panel 10 substantially vertical and may so function in a variety of particular installations. Where it is desired to mount the unit for use remote from walls and buildings, tubular posts 19 may be provided to extend above the ground in spaced, parallel relation suitable for engagement of their upper ends by the hooks 18, as in Figures 1 and 2, and where it is appropriate to mount the unit on a wall, eyes 20 may be fixed in and to project from the wall for engagement by the hooks 18, as in Figure 3, and a spacer block 21 may be inserted between the wall and a lower portion of the panel 10 if required to maintain approximately vertical disposition of the panel.

Constructed as shown and described, the improvement functions as a convenient and practical storage rack for hose and the like when mounted by means of its hooks 18 in any preferred location, desirably near the connection of a hose with its supply line, with the plane of the panel 10 substantially vertical, the panel length horizontal, and the panel long margin more nearly adjacent the brackets 12 uppermost. With the mounted rack unit available, the hose to be stored is carried near its attached end over the adjacent bracket 12 and against the panel 10, thence loosely under, about and over the other bracket 12 against the said panel and similarly under, about and over the first bracket in a loose figure 8 looping which is continued as a succession of adjacent bights on and outwardly of said brackets until the complete length of the hose 11, or any desired portion thereof, is racked; it being helpful for avoidance of possible entanglement that the successive hose loops be tightened slightly and progressively outwardly from the panel, whereby to dispose the looser loops closer to the panel, as indicated by the showing of Figure 1, and it being notable that an upward inclination of the bracket axes facilitates arrangement of successive loops in space-conserving, close contact about the brackets. Extension of the hose, or any desired portion thereof, from its racked condition is very simply accomplished by carrying the free end of the hose away from the rack, during which operation the hose loops slip freely and successively from the rack as slight tension on the hose impels the bights about the brackets 12 to slide outwardly thereon and over the apices 16 by virtue of reaction against and along the arcuately divergent and edge-rounded tubular wall margins; the reversals inherent in the figure 8 looping of the hose on the rack obviating any tendency of the extended hose to twist or kink as it is withdrawn from the rack.

While the improvement has been illustrated and described in association with and as a facility for the storage of lawn hose, it is manifest that it may correspondingly function with and for storage of other flexible members, whether or not of flow line character, and since changes, variations, and modifications in the form, construction, and arrangement of the elements shown and described may be had without departing from the spirit of my invention, I wish to be understood as being limited solely by the scope of the appended claims, rather than by any details of the illustrative showing and foregoing description.

I claim as my invention:

1. A storage rack for hose and the like comprising a flat, substantially rigid panel having a length exceeding its width adapted for fixed support in a substantially vertical plane with its length horizontal, like, longitudinally-interrupted, tubular brackets fixed in spaced, parallel relation to and correspondingly outstanding from upper corners of said panel with the bracket interruptions convergently directed inwardly and downwardly of the panel, and free bracket margins defining the longitudinal interruption thereof arcuately diverging upwardly and outwardly from the fixed end of each bracket, whereby to establish a rounded apex determinating the bracket maximum length in overhanging relation with the bracket interruption.

2. A storage rack for hose and the like comprising a flat, substantially rigid panel having a length exceeding its width, attaching means secured to one face of said panel engageable with fixed supports to mount said panel in a substantially vertical plane with its length horizontal, like, longitudinally-interrupted, tubular brackets fixed in spaced, parallel relation to and correspondingly outstanding from upper corners of said panel with the bracket interruptions convergently directed inwardly and downwardly of the panel, and free bracket margins defining the longitudinal interruption thereof arcuately diverging upwardly and outwardly from the fixed end of each bracket, whereby to establish a rounded apex determining the bracket maximum length in overhanging relation with the bracket interruption.

3. The organization according to claim 2, wherein said attaching means comprises like hooks fixed in spaced relation to the panel inwardly adjacent the upper long margin thereof to open transversely of the panel away from said adjacent long margin.

4. The organization according to claim 2, wherein the free bracket margins defining the longitudinal interruption of the bracket are inclined slightly and inwardly toward the interior of the associated bracket away from the tubular surface exteriorly characterizing the bracket.

References Cited in the file of this patent

UNITED STATES PATENTS

| | | |
|---|---|---|
| 2,222,831 | Bitney | Nov. 26, 1940 |
| 2,517,118 | Lee | Aug. 1, 1950 |
| 2,523,741 | Weschler | Sept. 26, 1950 |
| 2,760,746 | Botolfsen | Aug. 28, 1956 |